United States Patent

Pearson et al.

[11] Patent Number: 5,555,062
[45] Date of Patent: Sep. 10, 1996

[54] RECYCLABLE SINGLE-USE CAMERA WITH REPLACEABLE FRONT LENS ELEMENT

[75] Inventors: Douglas H. Pearson, Rochester; Jude A. SanGregory, Spencerport; Kevin P. Lyons, Rochester; Joseph R. Bietry, Rochester; Alan E. Lewis, Rochester, all of N.Y.

[73] Assignee: Eastman Kodak Company, Rochester, N.Y.

[21] Appl. No.: 368,182

[22] Filed: Jan. 3, 1995

[51] Int. Cl.⁶ .................................................. G03B 17/02
[52] U.S. Cl. ............................................................ 354/288
[58] Field of Search ........................... 354/288; 359/507, 359/511

[56] References Cited

U.S. PATENT DOCUMENTS

| | | | |
|---|---|---|---|
| 2,842,030 | 7/1958 | Geddes | 88/57 |
| 4,226,517 | 10/1980 | Skarman | 354/75 |
| 5,181,057 | 1/1993 | Takagi et al. | 354/94 |
| 5,239,326 | 8/1993 | Takai | 354/286 |
| 5,381,200 | 1/1995 | Takagi. | |
| 5,400,098 | 3/1995 | Rydelek. | |
| 5,436,685 | 7/1995 | Yamashina. | |

*Primary Examiner*—Monroe H. Hayes
*Attorney, Agent, or Firm*—Roger A. Fields

[57] ABSTRACT

A recyclable single-use camera in which a front casing portion is separable from a main body portion to replace a taking lens during recycling of said camera, is characterized in that the taking lens has a front lens element and a rear lens element. The rear lens element is secured to the main body portion in order to prevent removal of the rear lens element. The front casing portion holds the front lens element in optical alignment with the rear lens element, and permits removal of the front lens element to allow it to be replaced whenever the front casing portion is separated from the main body portion during recycling of the camera.

4 Claims, 2 Drawing Sheets

RECYCLABLE SINGLE-USE CAMERA WITH REPLACEABLE FRONT LENS ELEMENT

FIELD OF THE INVENTION

The invention relates generally to the field of photography, and in particular to single-use cameras. More specifically, the invention relates to a single-use camera which can be recycled at the manufacturer to permit it to be reused like an originally-manufactured one.

BACKGROUND OF THE INVENTION

Film and cameras that are all in one, commonly referred to as single-use cameras, have recently become well known. Typically, the single-use camera is a simple point-and-shoot type comprising a plastic, inner, main body portion which supports a fixed-focus taking lens, a film metering mechanism, a manual film advance thumbwheel, a single-blade shutter, a manual shutter release button, a frame counter for indicating the number of exposures remaining for picture-taking, a direct see-through viewfinder, and possibly an electronic flash unit. Plastic front and rear casing or cover portions house the main body portion between them to form a light-tight camera unit. A decorative cardboard outer box contains the camera unit and has respective openings for the taking lens, the shutter release button, the film advance thumbwheel, the viewfinder, the frame counter, and a flash emission window.

At the manufacturer, the main body portion is loaded with a 12, 24, or 36 exposure 35 mm film cassette, and the front and rear casing portions are connected to each other and/or to the main body portion to assemble a light-tight camera unit. Then, an exposed end of a spool in the main body portion is rotated to factory prewind substantially the entire length of the unexposed filmstrip from the cassette onto the spool. Lastly, the outer box is placed on the camera unit.

After the photographer takes a picture with the single-use camera, he or she manually rotates the thumbwheel to rewind the exposed frame into the cassette. The rewinding movement of the filmstrip the equivalent of slightly more than one frame width rotates a metering sprocket in engagement with the filmstrip to decrement the frame counter to its next lower-numbered setting. When the maximum number of exposures available on the filmstrip are exposed and the filmstrip is completely rewound into the cassette, the single-use camera is given to a photofinisher who tears the outer box off the camera unit, separates the rear cover portion from the main body portion, and removes the cassette with the filmstrip from the main body portion. Then, he removes the filmstrip from the cassette to develop the negatives and make prints for the customer, and he forwards the camera parts to the manufacturer for recycling, i.e. remanufacture. During recycling, the front cover portion is separated from the main body portion to permit the taking lens to be removed and replaced with a fresh one. The taking lens is often replaced because it may be scratched.

Single-use cameras may be recycled or remanufactured several times. Often, however, certain components such as the taking lens are replaced every time the single-use camera is recycled.

SUMMARY OF THE INVENTION

According to one aspect of the invention, a recyclable single-use camera in which a front casing portion is separable from a main body portion to replace a taking lens during recycling of said camera, is characterized in that:

the taking lens has a front lens element and a rear lens element;

means secures the rear lens element to the main body portion in order to prevent removal of the rear lens element; and the front casing portion has means for holding the front lens element in optical alignment with the rear lens element, and permits removal of the front lens element to allow it to be replaced whenever the front casing portion is separated from the main body portion during recycling of the camera.

According to another aspect of the invention, a method of recycling a single-use camera comprises:

separating a front casing portion from a main body portion to expose a front lens element of a taking lens;

removing the front lens element from the camera, but retaining in place a rear lens element of the taking lens;

replacing the front lens element with a fresh lens element; and returning the front cover portion or a fresh cover portion to the main body portion.

DETAILED DESCRIPTION OF THE INVENTION

The invention is disclosed as being embodied preferably in a single-use 35 mm camera. Because the features of a single-use 35 mm camera are generally known as shown for example in prior art U.S. Pat. No. 5,181,057, issued Jan. 19, 1993, the description which follows is directed in particular only to those elements forming part of or cooperating directly with the disclosed embodiment. It is to be understood, however, that other elements may take various forms known to a person of ordinary skill in the art.

Figure 1:
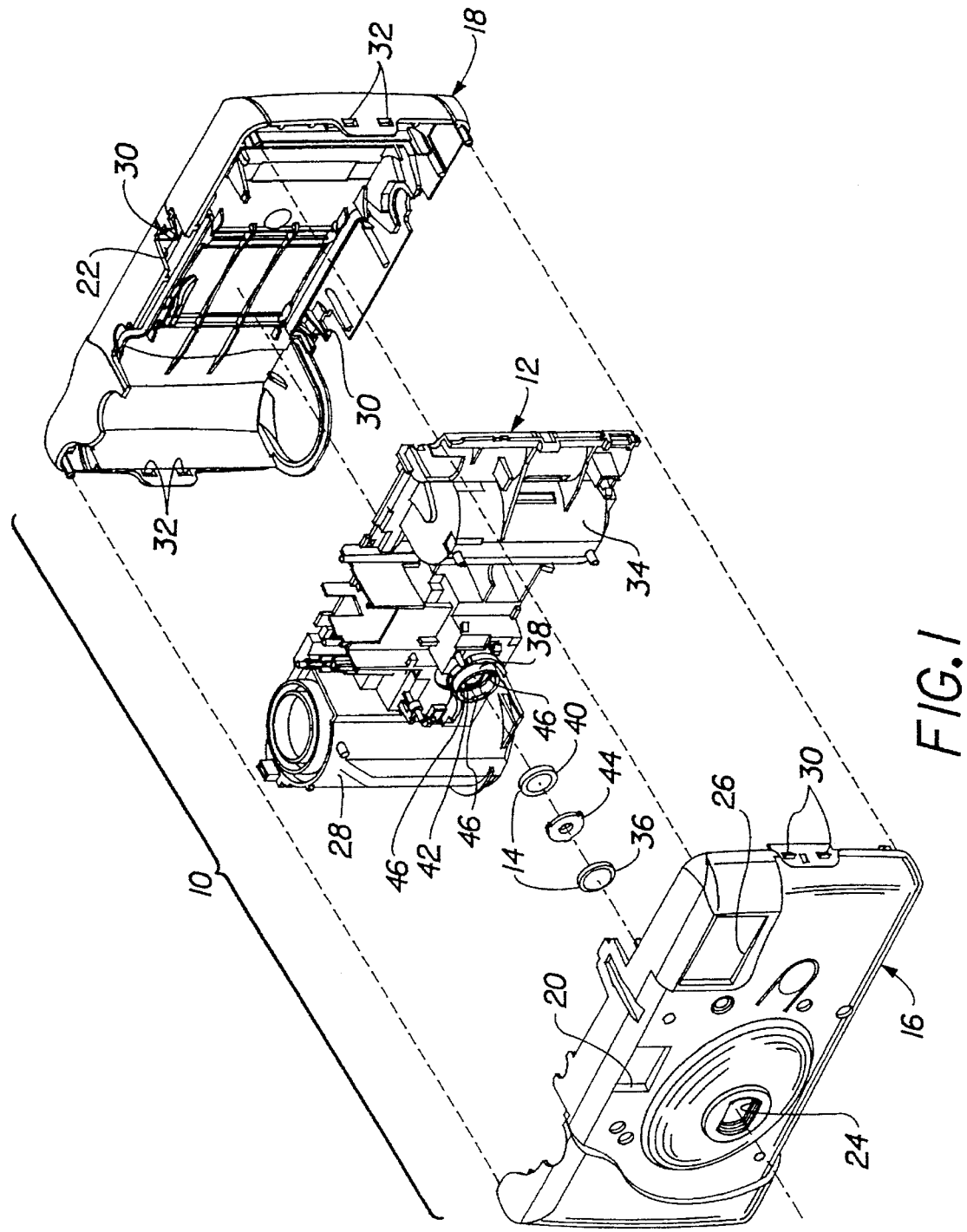
FIG. 1 is an exploded perspective view of a recyclable single-use camera with a replaceable front lens element, according to a preferred embodiment of the invention.

Referring now to the drawings, FIG. 1 depicts a single-use 35 mm camera 10 which is a simple point and shoot type comprising a plastic, inner, main body portion or frame 12 which supports a number of typical camera components, most not shown; for example, a fixed-focus taking lens 14, a film metering mechanism, a manual film advance thumbwheel, a single-blade shutter, a manual shutter release button, a frame counter for indicating the number of exposures remaining for picture-taking, and an electronic flash unit. Plastic front and rear casing or cover portions 16 and 18 house the main body portion 12 between them to form a light-tight camera unit. The front and rear casing portions 16 and 18 have front and rear viewfinder windows 20 and 22, and the front casing portion has a lens opening 24 and a flash emission opening 26. Front and rear decorative labels, not shown, cover central portions of the front and rear casing portions 16 and 18.

At the manufacturer, a chamber 28 in the main body portion 12 is loaded with a 12, 24, or 36 exposure 35 mm film cassette, not shown. Then, the front and rear casing portions 16 and 18 are connected to each other with the main body portion 12 between them to assemble a light-tight camera unit. See FIG. 1. A plurality of hooks 30 and a like number of mating holes 32, only partly shown, on the front and rear casing portions 16 and 18 engage to connect the front and rear casing portions together. Then, in a known manner, an exposed end of a spool, not shown, in a chamber 34 in the main body portion 12 is rotated to factory prewind substantially the entire length of the unexposed filmstrip from the cassette onto the spool. Lastly, the decorative labels are placed on the front and rear casing portions 16 and 18.

After the photographer takes a picture with the single-use camera 10, he or she manually rotates the thumbwheel to rewind the exposed frame into the cassette. The rewinding movement of the filmstrip the equivalent of slightly more than one frame width rotates a metering sprocket, not shown, in engagement with the filmstrip to decrement the frame counter to its next lower-numbered setting. When the maximum number of exposures available on the filmstrip are exposed and the filmstrip is completely rewound into the cassette, the single-use camera 10 is given to a photofinisher. The photofinisher disengages only the two hooks, not shown, and the corresponding holes 32 located at the left-hand sides of the front and rear casing portions 16 and 18, as viewed in FIG. 1, in order to fold the rear casing portion back at a groove 36 and uncover the chamber 28. Then, he removes the cassette with the filmstrip from the chamber 28, he removes the filmstrip from the cassette to develop the negatives and make prints for the customer, and he forwards the camera parts to the manufacturer for recycling, i.e. remanufacture. During recycling, the front cover portion 16 is separated from the main body portion 12 to permit a front lens element 36 of the taking lens 14 to be removed and replaced with a fresh one. The front lens element 36 is replaced because it may be scratched.

Figure 2:
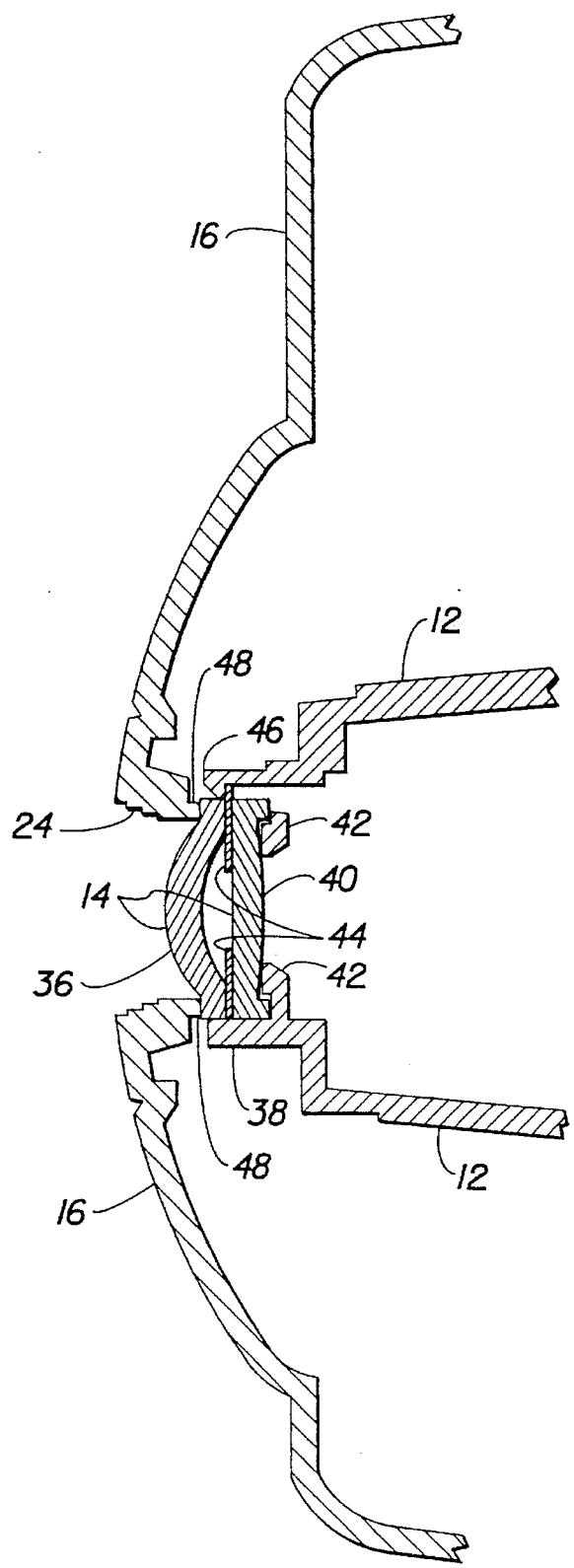
FIG. 2 is a sectional view of the lens arrangement in the single-use camera.

As shown in FIGS. 1 and 2, the main body portion 12 has a tubular lens mount 38 in which a rear lens element 40 of the taking lens 14 sits on an interior annular rib 42 of the lens mount. An aperture stop 44 is held on top of the rear lens element 40 by three evenly spaced external hooks 46 of the lens mount 38 to secure the rear lens element in place. The three external hooks 46 are aligned with the interior annular rib 42. The front casing portion 16 has an inwardly facing annular rib 48 that presses the front lens element 36 firmly against the aperture stop 44 as shown in FIG. 1, when the front casing portion is connected to the rear casing portion 18 with the main body portion between them. Thus, to replace the front lens element 36, all that is necessary is to separate the front casing portion 16 from the main body portion 12.

The invention has been described with reference to a preferred embodiment. However, it will be appreciated that variations and modifications can be effected by a person of ordinary skill in the art without departing from the scope of the invention.

PARTS LIST 10. single-use camera
12. main body portion
14. taking lens
16. front casing portion
18. rear casing portion
20. front viewfinder window
22. rear viewfinder window
24. lens opening
26. flash emission window
28. chamber
30. hooks
32. holes
34. chamber
36. front lens element
38. lens mount
40. rear lens element
42. annular rib
44. aperture stop
46. hooks
48. annular rib

We claim:

1. A recyclable single-use camera in which a front casing portion is separable from a main body portion to replace a taking lens during recycling of said camera, is characterized in that:

said taking lens has a replaceable front lens element and a non-replaceable rear lens element;

said main body portion has means for securing said rear lens element to the main body portion independently of said front lens element in order to prevent removal of the rear lens element when the front lens element is replaced; and said front casing portion has means for holding said front lens element in optical alignment with said rear lens element, and permits removal of the front lens element to allow it to be replaced when the front casing portion is separated from said main body portion during recycling of said camera.

2. A recyclable single-use camera as recited in claim 1, wherein said means that secures said rear lens element to said main body portion includes an aperture stop and at least one hook projecting from the main body portion to hold said aperture stop against the rear lens element to capture the rear lens element.

3. A recyclable single-use camera as recited in claim 2, wherein said means for holding said front lens element in optical alignment with said rear lens element includes inwardly facing means of said front casing portion that presses the front lens element against said aperture stop.

4. A method of recycling a single-use camera, comprising:

separating a front casing portion from a main body portion to expose a front lens element of a taking lens;

removing the front lens element from the camera, and retaining in place secured to the main body portion a rear lens element of the taking lens in order to reuse the rear lens element without having to optically re-adjust it;

replacing the front lens element with a fresh lens element; and returning the front cover portion or a fresh cover portion to the main body portion.

* * * * *